United States Patent Office 3,188,364
Patented June 8, 1965

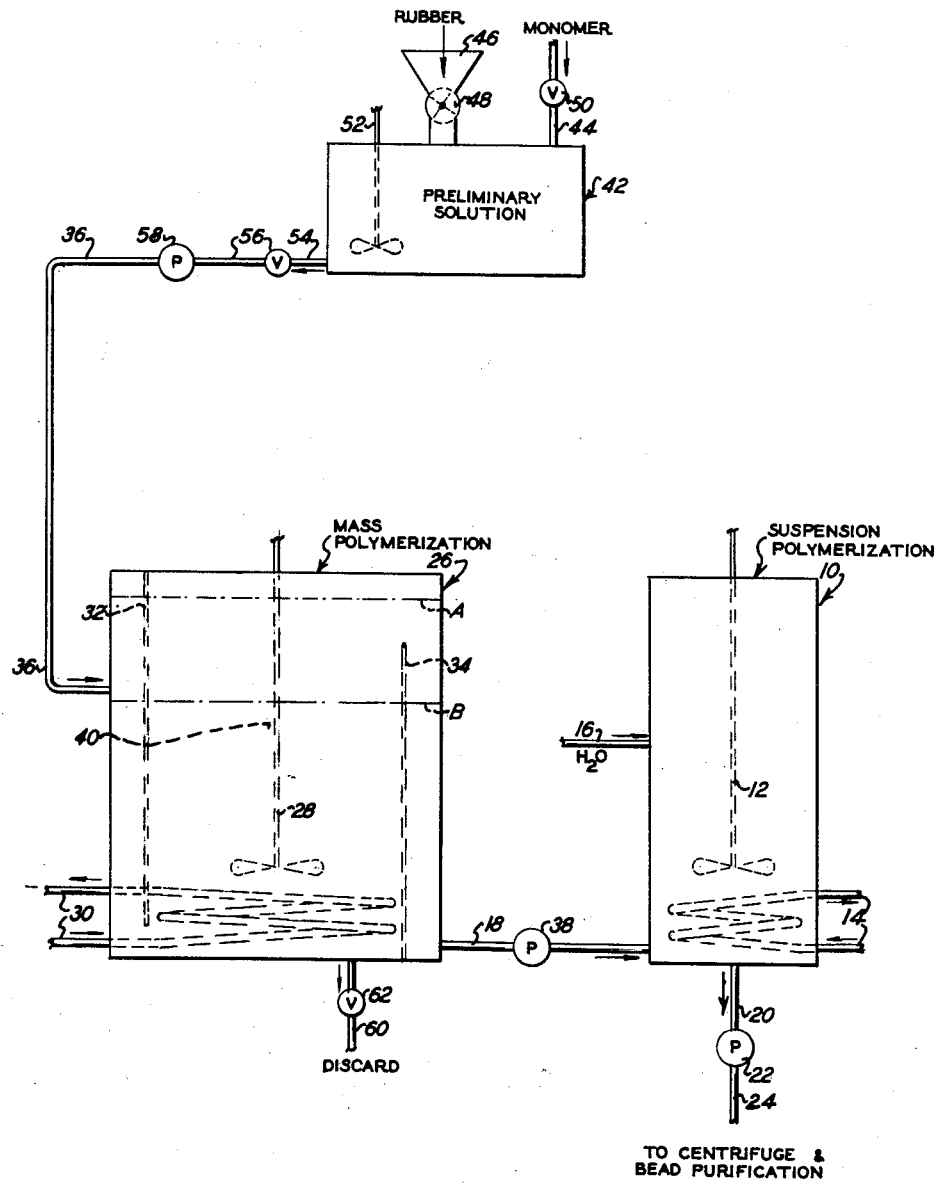

3,188,364
COMBINED MASTERBATCH PREPOLYMERIZA-
TION FEED FOR SUSPENSION POLYMERI-
ZATION
Renee P. Brown, Robert H. Dyer, Warden W. Mayes, and
Paul D. Meek, all of Big Spring, Tex., assignors, by
mesne assignments, to Cosden Oil & Chemical Company, Big Spring, Tex., a corporation of Delaware
Filed Dec. 20, 1960, Ser. No. 77,052
4 Claims. (Cl. 260—880)

This invention relates to suspension polymerization and more particularly to a preliminary masterbatch usually used for a graft copolymerization of polymer solution in monomer to bead form. Such masterbatch is a liquid partially polymerized solution of preformed polymer in a polymerizable monomer formed in a continuous or semicontinuous mass or bulk polymerization. The intermediate polymerized masterbatch is of relatively constant composition at least periodically, and a portion of it, as a liquid partial polymer, is transferred intermittently and batch-wise from the masterbatch to a suspension system for completion of the polymerization to bead form. The invention further relates to an improved suspension system and to the new masterbatch product of intermediate en masse copolymer.

This invention provides a process of producing a useful liquid masterbatch supply of intermediate en masse copolymer of the graft type, for ultimate completion by suspension polymerization to bead form. The masterbatch is a product of polymerizing en masse of an intermittent or continuous raw feed of a polymer solution in polymerizable monomer passed to a polymerizing zone containing partial polymer. The masterbatch per se is a new product of about a 5 to 40% graft copolymerized solution of a polymer in polymerizable monomer, whose continuous polymerization is regulated to have a substantially constant composition at certain periods of batchwise withdrawal for use as an intermittent feed to a suspension system in which the polymerization is completed.

In the art of graft copolymerization a preformed polymer such as, typically, synthetic rubber, such as butadiene-styrene copolymer 75/25, is dissolved in a monomer such as styrene, butadiene, acrylonitrile, or lower acrylic ester monomers for polymerization to a graft copolymer in which the preformed polymer, for example the rubber, is increased in molecular weight and copolymerized thereby in solution in the polymerized monomer to form a graft copolymer of high impact strength, among other improved properties. That polymer has been proposedly formed in the art by en masse polymerization involving continuously heating and stirring of the polymer in monomer solution together with usual modifiers such as antioxidant, aliphatic mercaptan, plasticizer, etc. The en masse polymerization reaction usually without catalyst takes a long time, 10 to 40 hours, typically 20 to 30 hours, for about a 30% graft copolymerization. At that stage, and particularly as the temperature of the reaction may increase exothermically, the reaction runs somewhat more rapidly and requires more careful temperature control to produce a final copolymer. A difficulty in such en masse polymerization is that as the viscosity increases, the heat transfer becomes poorer, and the control of the temperature of the reaction during the completion stages is more difficult with consequent impairment of the high quality of the graft polymer product, particularly the color.

In copending application, Serial Number 884,871, filed October 7, 1959, now Patent No. 3,047,543 issued July 31, 1962, also assigned to the present applicants' assignee, a mass polymerization is taught in which a partial polymer is formed of a solution of polymer in polymerizable monomer which is polymerized to about 5 to 40% polymerization in mass, which is then transferred to a suspension system for agitation in water with catalyst and certain suspending agents, whereby the partial mass polymer is converted to hard bead polymer of outstanding quality, particularly high impact strength and good color, among others.

The difficulty with that system is that the prepolymerization in a mass of the monomer solution of the preformed polymer, is a very slow process. It comprises agitating the solution in bulk or mass with modifying agents such as aliphatic mercaptan, antioxidant, and plasticizer, but usually no catalyst, for very long periods of time, about 10 to 30 hours at a temperature of about 210 to 240° F. until it has polymerized about 5 to 40% usually about 30%. At this stage the liquid partial polymer is suspended in about an equal volume of water, adding polymerization catalyst, suspending agents, etc. and the polymerization is completed with heating and agitation to bead polymer form in much fewer hours, about 6–9 hours. A normal practice can be merely adding water and suspending agents, catalyst etc. to the mass prepolymer batch after the preliminary 10–40 hours prepolymerization is completed. This would require a reaction kettle of very large capacity, about double that for the polymer batch to be produced to accommodate the suspension water. It would also require use of that single large kettle for the very long extra polymerization period for the single batch.

It would appear, accordingly, that a separate reaction kettle should be provided for the preliminary mass polymerization of smaller size so that both polymerizations, the preliminary mass polymerization and the subsequent suspension finishing polymerization to bead form can be carried on simultaneously in separate kettles. However, as indicated, the time cycle for the en masse polymerization is about 2 to 3 times as long as that needed for the suspension polymerization whereby efficient utilization of reaction time is not solved. It would appear to be necessary to use 2 or 3 en masse polymerization kettles to form the preliminary polymer feed for the suspension kettle, each staggered in timing of its cycle, so that mass polymerization can be completed every 6–9 hours as needed to supply the suspension polymerization kettle. However, this is much extra equipment for batch production and includes much extra control elements needed for such timing. Moreover, despite use of such extra equipment, the time cycle for producing a batch of bead polymer is not reduced. In this respect it will be noted that the graft copolymer hereof is often sold and used competitively with ordinary bead polymer such as pure crystalline polymerized monomer, but the copolymer with rubber is of better properties as indicated above. However, that competitive advantage is reduced by the greater time needed for its production, almost twice that of the pure crystalline polymerized monomer.

According to the present invention a unique masterbatch liquid partial polymer is formed of relatively constant composition. It comprises a 2 to 30% solution of preformed polymer in monomer mass polymerized to 5–40% partial polymerization, on an average preferably 20 to 40%. That average 20 to 40% polymerized masterbatch is formed by continuously or intermittently supplying raw preformed polymer solution in monomer to a preformed continuously polymerizing masterbatch. A portion of the partially polymerized masterbatch such as ¼ to ½, usually about ⅓ is withdrawn intermittently, batch-wise, for supply to the suspension system to complete its polymerization to bead form by suspension in water. The residual masterbatch is replenished by raw solution of polymer and monomer either rapidly, batchwise, to immediately replace its content as it is diminished, or it is replenished with raw polymer solution in monomer slowly and continuously at a rate only sufficient or refill the masterbatch kettle between periods when a batch is withdrawn. In either case, the raw material solution supplied to the masterbatch is mixed with the residual partial mass polymer in the kettle and both are polymerized. That is, the raw material added begins to polymerize and the residual polymeric solution continues to polymerize and the agitated mixture assumes a constant average polymer content after a number of periodic withdrawal and periodic or continuous replenishments. In this manner a constant average partial mass polymer composition is prepared and maintained continuously to provide a constant masterbatch mass polymer supply.

To establish such system according to this invention, an en masse polymerization kettle having a capacity of for example, about 2 to 4, usually about three times, the necessary batch-wise supply of masterbatch partial en masse polymer needed for operating at least one suspension polymerization, is provided. For instance, 100 parts of raw polymer solution in monomer for example synthetic rubber in monomeric styrene, together with the usual additives such as aliphatic mercaptan, antioxidants, plasticizers and the like, is added to the kettle and stirred at a polymerization temperature such as 210 to 240° F. for 10 to 20 hours until 10–40%, usually about 30%, polymer solution is formed. About ⅓ of the quantity, such as 30 parts of the prepolymer formed, is withdrawn from the kettle and discarded (or formed into polymer by longer polymerization, i.e., a system other than that here prepared). That quantity is replaced by a similar quantity of raw rubber in monomeric styrene solution in the kettle and the reaction is continued until the average polymerization again about 30% has taken place and then, after about ⅓ of the total batch is withdrawn and "discarded," it is replaced with 30 parts of another raw monomer solution. This continuous polymerization to bring the average polymerization of the masterbatch to about 30%, discarding about ⅓ of the masterbatch volume and replacement with raw material, is repeated about 5 to 15 times. At this time, the final composition of the kettle is substantially constant, for example about 30% polymerized as an average. It is a new product, whose primary utility is as a raw feed solution to a suspension system in which its polymerization is completed.

This typically is a usual masterbatch which is maintained as such by drawing off about ⅓ of its volume and finishing it by suspension polymerization in water to bead form and the masterbatch kettle has its depleted volume replaced by raw polymer solution in monomer, the new raw material and residual polymer being continuously polymerized in the same manner, to maintain a constant average polymerized content. By establishing such constant masterbatch supply, the mass polymer is continuously available for passage batch-wise to suspension polymer kettles. A very substantial time saving is effected because the time cycle to form the mass polymer by such system has not only been reduced, but the actual time cycle practically is the same as that of the suspension kettles, since the masterbatch is continuously available.

There are two practices available for applying the principle of this system. In a first intermittent batch supply modification, the masterbatch kettle, after establishing the average composition, is refilled with raw polymer solution rapidly and immediately following removal of a similar quantity for the purpose of finishing the polymerization by suspension. In a system of this modified type, the newly added raw polymer solution in monomer has almost the total time period from withdrawal of one batch to withdrawal of the next from the masterbatch kettle to continue to increase the residual polymer content from both the entire batch of replenishing raw material added to the masterbatch kettle and the unreacted monomer remaining from preceding batches. This modification is considered to be an intermittent batch addition of raw material to the masterbatch kettle, following each withdrawal of partial en masse polymer.

In a second modification, the raw polymer solution in monomer is added slowly and continuously to replace the large intermittently withdrawn portion batch-wise, so that the mass reaction kettle is substantially filled slower in about each time interval between batch removals. The average composition of the masterbatch remains substantially the same desired range of average polymerized content and of preselected constant composition: In effect, while the intermediate partial polymer is taken off batch-wise for finishing to hard bead polymer, the raw material is added thereto slowly and continuously. The foregoing methods are both useful to produce a useful mass polymer master-batch as a constant supply of raw material for suspension polymerization.

Accordingly, as described, this system makes preliminary mass polymerization followed by suspension polymerization to change the en masse polymer, to beads of good quality, commercially feasible, in that the longer partial mass polymerization time which heretofore was necessary, is in effect cancelled because it is run simultaneously with the suspension polymerization. The old method is replaced by making continuously available a supply of partially polymerized material en masse of consistent average partial polymer composition adequately fluid to be suspended and finished to bead polymer form. Since the masterbatch supply is continuously available, the system then requires no more than the same average time as required in a suspension polymerization alone, for example, to make crystalline polymer.

The system is further explained in conjunction with the single sheet of drawings which diagrammatically illustrates its operation. As shown, the system comprises a suitably large suspension polymerization kettle 10 which may be jacketed (not shown), or may be otherwise heated, such as by a coil 14, through which steam is circulated. The suspension polymerization tank 10 will be of conventional reactor tank construction fitted with an agitator 12. A duct 16 supplies water and a duct means 18 supplies polymer. The tank has an outlet duct 20, a pump 22 and duct 24 to pass the final suspended bead reaction product to centrifuge and bead purification units (not shown) as is conventional in a suspension system.

The liquid masterbatch partial polymer is formed in a tank 26 by a mass polymerization. The tank 26 is a conventional large kettle having an agitating means 28 mounted therein and a means for heating the kettle, usually by jacketing (not shown) or by heating coils 30 within the kettle 26 through which steam or other heating medium may be passed. If desired, the tank may contain some inlet and outlet baffling walls 32 and 34 whose purpose is merely to prevent raw materials entering from an inlet duct 36 to pass through to an outlet duct 18 without adequate agitation in the body of the masterbatch 40 being polymerized in the kettle. The raw material can be made up in a preliminary solution tank 42 which has a valve 50 controlling an inlet duct 44 and a hopper 46 feeding dry polymer such as rubber into the preliminary solution tank. The quantity of rubber can be controlled by rotation of a star wheel 48 and the quantity of monomer by a valve 50. An agitator means 52 may be mounted in the solution tank 42 for purposes of forming a homogeneous solution of the rubber polymer in monomer. The preformed raw material passes from the preliminary solution tank by way of a duct 54 controlled by a valve 56 as impelled by pump 58 through inlet duct 36 of the mass polymerization tank.

In operation, monomer solution, for example 2 to 30% of preformed polymer such as GRS rubber, is made up in a monomer solvent, such as styrene, by agitating the rubber solids in the liquid monomer solvent in the tank 42. In forming the masterbatch the preformed raw solution, with the valve 56 open, is pumped into the mass polymerization tank 26 by pump 58 by way of duct 36 to substantially fill the tank 26 up to a point near the top, such as dotted line A. The monomer solution is heated to a temperature of 210 to 240° by a heating medium supplied through coil 30 and agitated while heating for a period of 6 to 10 hours (the usual time to effect and finish suspension polymerization of partial polymer to hard bead form.) A substantial portion, for example about ⅓ of the raw partially polymerized liquid, polymerized en masse to any preselected degree, is then withdrawn through a duct 60, opening valve 62, and discarded from the system. The total quantity of fluid in tank 26 is thus lowered to an intermediate level such as to the dotted line B. The further procedure is by either of the following modifications:

MODIFICATION 1

According to this modification, as explained above, following the withdrawal of a part of the partially polymerized solution, the space between dotted lines A and B is immediately and relatively rapidly refilled with fresh raw polymer solution up to the level A taking only a usual time as needed for pumping additional raw polymer solution up to the full tank capacity, operating the pump 58 to refill the tank 26 to the level A, by way of line 36 from the raw solution tank supply 42. The heating and agitating are continued in the refilled tank 26 for an additional and similar batch withdrawal, discarding again by way of line 60 as controlled by valve 62, and the tank 26 again refilled as described. This operation is repeated a number of times, at least 5, and even as many as 10 to 20 times, whereby relatively constant composition is produced in the tank 26. Even after the masterbatch liquid has reached the substantially constant composition and the withdrawn liquid is used for finishing to final polymer, this same replenishing procedure is followed.

MODIFICATION 2

Following this procedure, after each withdrawal of the partially polymerized solution from level A down to level B by way of line 60 as controlled by valve 62 and discarding, the polymerization is continued, but instead of relatively rapidly refilling tank 26, the raw reaction fluid to replace that which was withdrawn, raw preformed solution from tank 42 is added very slowly by way of duct 36 as impelled by pump 58. The rate of replenishing flow to tank 26 being controlled by valve 56 in duct 54 to supply raw polymer solution at such rate that the tank 26 is refilled over a long time period such as from one batch withdrawal to the next (6 to 10 hours). Thus, the raw material solution entering the masterbatch through duct 36 may flow continuously, filling from level B to level A. That rate usually is about fast enough just to maintain the average polymer content of the masterbatch continuously constant. The reduction of liquid level from A to B is effected by intermittent withdrawals at 6 to 10 hour intervals and discarding through line 60 until the desired degree of polymerization is reached. This slow, continuous addition of raw feed to the continuously polymerizing masterbatch liquid is continued even when the withdrawn portions are used for finishing to bead form. Thus, as distinguished from Modification 1, the law liquid is added continuously and a large portion is withdrawn batchwise rapidly.

Whichever procedure is followed, Modification 1 or Modification 2, the mass polymer composition 40 therein after sufficient batch discardings from the system by way of line 60 as controlled by valve 62 approaches a composition which is relatively constant to a preselected degree of polymerization.

When this final constant composition is reached, the mass polymerization continues without discarding, as a continuous mass polymerization, and the masterbatch polymer withdrawn in the batch portions between the levels A and B is passed by way of duct 18 and pump 38 to the suspension polymer tank 10. This tank has been or is about half filled with water, suspending agents and catalyst from duct 16 and the mass partial polymer and water are agitated and heated for 6 to 10 hours with continuous agitation at temperatures above about 180° F. until hard beads are formed from the partial polymer. The suspension is then withdrawn through duct 20 as impelled by pump 22 through duct 24 to a bead purification stage such as a centrifuge, acid wash and the like for purification which is usual procedure and forms no part of this invention. After the suspension polymerization tank has been discharged as hard bead product, it is again refilled batchwise by partial mass polymer taken from the masterbatch supply in tank 26, a charge sufficient for the suspension polymerization being about ⅓ mass polymer formed in tank 26. Again, that quantity between the levels A and B, withdrawn as a batch supply to the suspension polymerization tank and the mass polymerization tank is then replenished according to Modification 1 or 2, whichever is being followed. The following examples illustrate the practice of this invention.

The following ingredients were charged as a solution to a small mass reactor:

Example I

| Material: | Parts by weight |
| --- | --- |
| Styrene monomer | 100 |
| Styrene-butadiene 75/25 rubber | 6 |
| Lauryl mercaptan | 0.06 |
| Antioxidant | 0.08 |
| Plasticizing oil | 1.0 |

The solution was heated to a temperature of 210° F. and stirred to effect a steady mass reaction. When the mass reached approximately 25% conversion after 16 hours, 30 parts were withdrawn and discarded. Thirty parts of the same original solution were added to the reactor in a batch to bring the mass back to the total 107.14 parts. The above heating and stirring was repeated and polymer again withdrawn at 25% conversion in ten hours. This withdrawing and adding was repeated 10 times, such that the material withdrawn was effectively the same each time. On the the 11th time, 30 parts were again withdrawn to another tank and agitated together with 30 parts of water, 0.1 part of benzoyl peroxide catalyst, 0.15 part of trisodium phosphate, 0.19 part of calcium chloride, 0.10 part of polyvinyl alcohol, 0.0019 part of lecithin, and 0.06 part of sodium dodecyl benzene sulfonate. The suspension system was heated at about 100° C. for 6 hours. The product was very uniform beads which, after washing and drying, were of clear color, of which about 82 percent passed through a 40 mesh screen. This graft polymer had a light color and an impact strength of 1.5 ft. pounds. After withdrawal of the last 30 parts for finishing by suspension from the original masterbatch, raw solution, the same as the original, in the similar quantity of 30 parts was added to the masterbatch, continuing with heating and stirring, so that the masterbatch comprised a ready and continuous supply of partially polymerized liquid as a ready supply for withdrawal to the next finishing batch, as needed, for the suspension reaction.

Example II

The following ingredients were charged as in Example No. I.

| Material: | Parts by weight |
| --- | --- |
| Styrene monomer | 100 |
| SBR rubber | 8 |
| Aliphatic mercaptan | 0.10 |
| Antioxidant | 0.08 |
| Plasticizing oil | 1.5 |

The raw solution was similarly heated and stirred to effect steady mass polymerization. When the mass reached 28% conversion, 20 parts were withdrawn and discarded. Twenty parts of the above original charge were added and heating continued as above to return the mass to 28% conversion. A batch of the partial polymer was again withdrawn. This adding, heating and withdrawing was continued in the same manner 15 times such that the material withdrawn was similar each time. On the 16th time the mass withdrawn was suspended as in Example No. I, catalyst added and the reaction carried to completion by agitation with heat in water. The polymer was washed, dried, and molded for test. The impact strength was 1.6 ft. lbs. This example illustrates that the masterbatch can be controlled to whatever polymerization is desired. This example illustrates 28% batch polymerization but could be 20% or 40% as desired. Moreover, the masterbatch is substantially established after about 5 discards and the more it is used, i.e., the more batch portions withdrawn, the more constant is the composition. This example illustrates that only slight variation occurs between operation of the masterbatch after 15 discardings in contrast to 10 of the first example.

Example III

A solution was prepared and reacted as in Example No. II until 28% conversion was reacted. Thirty parts of the mass were withdrawn and discarded. A solution prepared as in Example No. II was then slowly fed into the mass reactor, such that the total mass was held in 28% conversion by the slow supply of the unpolymerized monomer solution even though the reaction continues. The rate of feed was adjusted slowly such that the total average conversion could be held near 28%. When the reactor again held a quantity equal to the original charge, 30 parts were withdrawn and discarded and the reaction continued with gradually increasing rate of addition. When the reactor was again to the original level, withdrawal was repeated. This cyclic process was maintained until 10 withdrawals had been made to insure a constant composition. The 11th withdrawal was then suspended and finished as in Example No. II. The impact was 1.61 ft. lbs. This example illustrates that only slight variation occurs when Modification 1 is followed, replenishing the masterbatch as a continuous slow feed between the one withdrawal and the next and that slow feed can be at a rate to continuously maintain the average polymer content constant.

As pointed out in the parent application, the prepolymerized component of the product can be polystyrene, polybutadiene, polyisoprene, polycyclopentadiene, natural rubber, chlorinated rubber, polychloroprene, polypiperylene, polyacrylonitrile, copolymer of butadiene with styrene, copolymer of butadiene with acrylonitrile and copolymer of butadiene with isobutylene in a liquid monomer. The liquid monomer can be a vinyl aromatic compound such as: styrene, divinyl benzene, vinyl pyridine, vinyl chloride, vinyl acetate, vinyl propionate, vinylidene chloride, lower alkyl esters of acrylic acid such as methyl acrylate, lower alkyl esters of methacrylic acid, butadiene, piperylene, isoprene, chloroprene, acrylonitrile and the like, and mixtures of such monomers.

Thus, as pointed out, a mass partial polymer is formed into and maintained as a masterbatch comprising a continuous polymer mass at a rate to form a preselected average degree of partial polymerization which can be from about 5 to 40%. Usually 20 to 40% is desired. The control imparted to the masterbatch is such as to maintain a substantially constant average polymer content continuously or at the time a batch is withdrawn from finishing. The masterbatch polymerization is operated in such a manner, according to a first modification, that the raw material is replenished batchwise after a batchwise withdrawal of a partially polymerized portion, and the mass polymerization is continued until the next periodic withdrawal; or, according to the second modification, a small quantity of raw material solution of preformed polymer in monomer is slowly fed to the masterbatch reactor at a rate such that the batch withdrawal portion is just replenished by the time the next batch is withdrawn from the masterbatch for finishing and preferably at a rate to maintain the masterbatch polymer content continuously constant.

While it is stated that in forming the masterbatch prepolymer, numerous portions are "discarded" before the masterbatch attains the desired constant composition, the discarded portion can be also polymerized and by any method, but it will not have the desired constant prepolymer composition.

Various modifications will occur to those skilled in the art and accordingly, it is intended that the examples herein given be regarded as illustrative and not limiting except as defined in the claims below.

We claim:

1. The method of polymerizing a 2 to 30% solution of a preformed solid polymer of the group consisting of polybutadiene and copolymer of butadiene with styrene in monomer styrene as the solvent, comprising prepolymerizing said solution in a mass with agitation at a temperature between about 200 and 240° F., and withdrawing equal batch portions up to about one half of the original batch quantity being polymerized, discarding said batches and replenishing the original batch with said fresh unpolymerized solution while continuing said polymerization until, at the time of said batch withdrawal, said solution being polymerized has a constant preselected polymerized monomer solvent content in the range of 5 to 40%, continuing the withdrawal of solutions batchwise from the said continuously polymerizing masterbatch solution and then independently polymerizing each batch withdrawal portion from said masterbatch by agitating the same continuously as a suspension in water until the polymerization thereof is completed to hard bead form and replenishing said masterbatch with unpolymerized solution of polymer and monomer following each batch withdrawal.

2. The method as defined in claim 1 wherein the said monomer solution is added to the continuously reacting masterbatch batchwise to replace the depleted volume of the masterbatch, after removal of each batch-wise withdrawn portion.

3. The method as defined in claim 1 wherein the said monomer solution is added to the continuously reacting masterbatch continuously over a period of time substantially the same as the period between each batchwise withdrawal from the masterbatch in quantity to substantially replenish the withdrawn portion.

4. The method as defined in claim 1 wherein the portions withdrawn from the masterbatch are first discarded periodically at least twice until each portion withdrawn from the masterbatch has substantially the same copolymer content as the next at the time of withdrawal before passing the withdrawn portion to the said final finishing stage of agitating the withdrawn portion in water to complete the polymerization to final bead form.

(References on following page)

References Cited by the Examiner

UNITED STATES PATENTS

| | | | |
|---|---|---|---|
| 2,566,567 | 9/51 | Hutchinson et al. | 260—93.5 |
| 2,745,818 | 5/56 | TeGrotenhuis | 260—880 |
| 2,777,832 | 1/57 | Mallison | 260—881 |
| 2,789,962 | 4/57 | Groff et al. | 260—880 |
| 2,913,426 | 11/59 | Li et al. | 260—880 |
| 2,957,833 | 10/60 | Baum | 260—880 |
| 3,052,664 | 9/62 | Cleland et al. | 260—93.5 |

FOREIGN PATENTS

| | | |
|---|---|---|
| 228,748 | 6/60 | Australia. |

MURRAY TILLMAN, *Primary Examiner.*

D. ARNOLD, LEON J. BERCOVITZ, JAMES A. SIEDLECK, *Examiners.*